United States Patent
Kutti et al.

(10) Patent No.: US 11,456,854 B2
(45) Date of Patent: Sep. 27, 2022

(54) PROTECTING CRYPTOGRAPHIC KEY DATA

(71) Applicant: Nordic Semiconductor ASA, Trondheim (NO)

(72) Inventors: Kauko Kutti, Trondheim (NO); Jarmo Veikkola, Trondheim (NO); Marko Winblad, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 176 days.

(21) Appl. No.: 16/968,121

(22) PCT Filed: Feb. 14, 2019

(86) PCT No.: PCT/EP2019/053659
§ 371 (c)(1),
(2) Date: Aug. 6, 2020

(87) PCT Pub. No.: WO2019/158641
PCT Pub. Date: Aug. 22, 2019

(65) Prior Publication Data
US 2021/0218545 A1 Jul. 15, 2021

(30) Foreign Application Priority Data
Feb. 16, 2018 (GB) ..................... 1802582

(51) Int. Cl.
*H04L 9/00* (2022.01)
*H04L 9/06* (2006.01)
*H04L 9/08* (2006.01)

(52) U.S. Cl.
CPC ............ *H04L 9/002* (2013.01); *H04L 9/0643* (2013.01); *H04L 9/0894* (2013.01)

(58) Field of Classification Search
CPC ...... H04L 9/002; H04L 9/0643; H04L 9/0894
(Continued)

(56) References Cited

U.S. PATENT DOCUMENTS

| | | | | |
|---|---|---|---|---|
| 2011/0302418 A1* | 12/2011 | Fujisaki | ............... | H04L 9/3242 713/179 |
| 2013/0195266 A1* | 8/2013 | Fischer | ............... | H04L 9/0643 380/44 |
| 2017/0185806 A1* | 6/2017 | Kong | ..................... | G06F 21/45 |

FOREIGN PATENT DOCUMENTS

| | | |
|---|---|---|
| CN | 107835071 A | 3/2018 |
| WO | WO2018/039012 A | 3/2018 |

OTHER PUBLICATIONS

IPO Search Report under Section 17(5) for GB 1802582.5, dated Aug. 16, 2018, 5 pages.

(Continued)

*Primary Examiner* — Kambiz Zand
*Assistant Examiner* — Aubrey H Wyszynski
(74) *Attorney, Agent, or Firm* — Klarquist Sparkman, LLP

(57) ABSTRACT

A cryptographic module is switchable between a key-input mode and a data-input mode. In the key-input mode, the cryptographic module receives key data, key length information and first input data, combines an amount of the key data corresponding to the key length information with the first input data to produce combined data, wherein a key-influenced length of the combined data is the shortest length of the combined data that contains every data bit of the combined data whose value depends on the key data. It performs a cryptographic operation on the combined data to generate first output data and does not output any of the first output data until after the cryptographic operation has been applied to all of the key-influenced length of the combined data. In the data-input mode of operation, the cryptographic module receives a quantity of second input data whose length can be less than said key-influenced length, performs the cryptographic operation on the second input data to (Continued)

generate second output data and outputs the second output data.

18 Claims, 3 Drawing Sheets

(58) Field of Classification Search
USPC .......................................................... 713/190
See application file for complete search history.

(56) References Cited

OTHER PUBLICATIONS

International Search Report and Written Opinion for PCT/EP2019/053659, dated Apr. 26, 2019, 28 pages.
Krawczyk et al., "HMAC: Keyed-Hashing for Message Authentication," Network Working Group, Feb. 1997, 12 pages.

* cited by examiner

PROTECTING CRYPTOGRAPHIC KEY DATA

CROSS REFERENCE TO RELATED APPLICATIONS

This is the U.S. National Stage of International Application No. PCT/EP2019/053659, filed Feb. 14, 2019, which was published in English under PCT Article 21(2), which in turn claims the benefit of Great Britain Application No. 1802582.5, filed Feb. 16, 2018.

BACKGROUND OF THE INVENTION

This invention relates to apparatus and methods for protecting cryptographic key data within a cryptographic module.

It is known for cryptographic modules, that implement a basic cryptographic operation in hardware or software, to receive input data and to apply the cryptographic operation to the input data in order to generate output data.

For example, SHA-256 is a cryptographic hash function that can receive an arbitrary amount of input data and that outputs a 256-bit value that depends on the input data. The output data is such that it is infeasible to work out what the input data was from the output data, and it is infeasible to find alternative input data that yields the same output data.

Such cryptographic operations can be used as the building blocks of more complex algorithms. For example, SHA-256 or MD5 can be used as a subroutine within a more-complex keyed-hash message authentication code (HMAC) algorithm—e.g., as specified in RFC 2104. An HMAC algorithm may itself be used as a subroutine within a more-complex cryptographic key derivation function (KDF), such as PBKDF2.

In some situations, the input data to a basic cryptographic operation (e.g. SHA-256) may comprise secret key data in addition to other secret or non-secret data, such as a salt value, padding data or message data. The secret key data (e.g., a password or cryptographic key) may be combined with the other input data to form combined data, which the cryptographic operation is applied to. This combining operation may be a bitwise XOR'ing, as in RFC 2104 HMAC.

It is often important that such key data is not discovered, accidentally or by an attacker. In some electronic devices, the secret key data is well protected by hardware protection mechanisms. However, the other input data may be less securely controlled—e.g., not being protected by hardware, but being able to be set to arbitrary values by software executing on a device.

The present inventors have realised that the act of combining of secret key data with other input data, to generate combined data on which a basic cryptographic operation is then performed, known in the art, can present an opportunity for an attacker to discover the secret key data, by manipulating the values of the other input data and the execution of the cryptographic operation.

The present invention therefore seeks to provide a more secure approach to performing cryptographic processes that involve combining sensitive key data with other input data.

SUMMARY OF THE INVENTION

From a first aspect, the invention provides a cryptographic module that is switchable between a key-input mode of operation and a data-input mode of operation, wherein:

when in the key-input mode of operation, the cryptographic module is configured to: receive key data, key length information and first input data; combine an amount of the key data corresponding to the key length information with the first input data in a combining operation to produce combined data, wherein a key-influenced length of the combined data is the shortest length of the combined data that contains every data bit of the combined data whose value depends on the key data; perform a cryptographic operation on the combined data to generate first output data; and not output any of the first output data from the cryptographic module until after the cryptographic operation has been applied to all of the key-influenced length of the combined data;

the cryptographic module is configured to output the first output data after the cryptographic operation has been applied to all of the key-influenced length of the combined data; and when in the data-input mode of operation, the cryptographic module is configured to: receive a quantity of second input data having a length that can be less than said key-influenced length; perform the cryptographic operation on the second input data to generate second output data; and output the second output data.

From a second aspect, the invention provides an electronic device comprising such a cryptographic module.

From a third aspect, the invention provides a method of performing a cryptographic operation, the method comprising:

receiving key data, key length information and first input data;

combining an amount of the key data corresponding to the key length information with the first input data in a combining operation to produce combined data, wherein a key-influenced length of the combined data is the shortest length of the combined data that contains every data bit of the combined data whose value depends on the key data;

performing a cryptographic operation on the combined data to generate first output data;

not outputting any of the first output data until after the cryptographic operation has been applied to all of the key-influenced length of the combined data;

outputting the first output data after the cryptographic operation has been applied to all of the key-influenced length of the combined data;

receiving a quantity of second input data having a length that is less than said key-influenced length;

performing the cryptographic operation on the second input data to generate second output data; and outputting the second output data.

Thus it will be seen that, in accordance with the invention, the cryptographic operation can be applied to general input data, which may consist of a relatively small amount of data, when operating in the data-input mode. However, when operating in the key-input mode, the cryptographic module will not output results of the cryptographic operation until it has ensured that (i) all of the key data has been included in the combining operation, and (ii) the cryptographic operation has been applied to all of the combined data that depends on the key data.

This prevents an attacker from discovering the key data by applying the cryptographic operation to only a portion of the key data. Without the invention, an attacker might be able to input only a portion of the key data to a combining operation in a cryptographic module, and thereby discover information about the key data from the output data, or might input all of the key data but interrupt or finalise a cryptographic operation before all of the combined data that depends on the key data has been processed properly through the cryptographic operation, again revealing information from which the key may be deduced.

A naïve approach to addressing this problem would be always to require at least a minimum length of data to be input to the cryptographic operation, where the minimum input length is no smaller that the key-influenced length. However, this would prevent such a cryptographic module from being used to process shorter lengths of input data in any circumstance. By having a separate data-input mode of operation, in which the same cryptographic operation can be applied to shorter lengths of input data when no secret key data is present, the present invention provides a much more useful cryptographic module.

It should be understood that the cryptographic module may, at least in some embodiments, be able to receive and apply the cryptographic operation to input data that is equal to or longer than the key-influenced length, when in the data-input mode of operation. What is essential is that the cryptographic module is at least capable of receiving and applying the cryptographic operation to second input data that is less than said key-influenced length, when in the data-input mode of operation.

The cryptographic module may be part of an electronic device such as a personal computer, smartphone, automobile, domestic appliance, system-on-chip, radio-on-a-chip, etc. The device may comprise one or more: processors, memories, data buses, user interfaces, radio interfaces, power supplies, etc. The device may comprise a key store, for storing the key data. In some embodiments, the key store may be a component of the cryptographic module. The key store may be a hardware key store, i.e., a physical circuit, which may be separate from any general-purpose processor or general-purpose memory (e.g., SRAM) of the device. The key store may comprise digital logic and memory (e.g., registers) that are not generally accessible to the device. Access to the key store may be restricted. Access may be more restricted compared with another memory area on the device. A memory of the key store may be unreadable by a processor of the device, or may be readable by the processor only when the processor is in a privileged execution state. The key store may be connected to the cryptographic module by a secure bus. The secure bus may be separate from a general bus on the device, which connects the processor to a memory and optionally to one or more peripherals. The secure bus may use bus encryption, or it may be "secure" in that no processor of the device is connected to the secure bus. The key store may comprise a control interface for receiving instructions from a processor—e.g., an instruction to send the key data and/or the key length information to the cryptographic module. The device may comprise at least one processor that is not coupled to the secure bus.

The key store may provide the key length information to the cryptographic module. The cryptographic module may comprise a key memory (e.g., a key register) for receiving the key data, and may comprise a key-length memory (e.g., a key-length register) for receiving of key length information. The key store may be configured to send the key data and the key length information to the cryptographic module—e.g., as a bus master, using direct memory access (DMA) over a secure bus. The key store may send both the key length information and the key data in response to a single instruction (e.g., from a processor); this can increase security compared with writing the key data and the key length information in two separate operations, because it prevents malicious software from causing the key data to be written without the correct accompanying key length information also being written. The key length information preferably indicates the length of the key data to be received by the cryptographic module. Thus, the key store is preferably configured to send key length information that represents the exact length of key data that the key store sends to the cryptographic module. The length information may, for example, be a binary value equal to the number of bits or bytes or words of the key data to be received by the cryptographic module.

The cryptographic module may comprise a control unit. A state of the control unit may determine whether the module is in the key-input mode of operation or in the data-input mode of operation. The control unit may comprise an input for receiving instructions from a processor—e.g., a register interface. The mode of operation may be dependent on an instruction received at the input. In this way, software executing on the device can set the cryptographic module in data-input mode or key-input mode as required.

The cryptographic module may use any appropriate mechanism to avoid, prevent or block outputting of any of the first output data until the cryptographic operation has been applied to all of the key-influenced length of the combined data.

The cryptographic module may comprise a cryptographic operation unit configured to perform the cryptographic operation. The module may comprise or access an output memory (e.g., an output register) for providing output data to another component of the device, such as a processor, which might, for example, read from the output register using DMA. The module may comprise an output gate, downstream of the cryptographic operation unit, which blocks output from the cryptographic operation unit when the gate is closed and which passes or permits output when the gate is opened. The output gate may be controlled by the control unit. The cryptographic module may be configured so that the output gate is open (e.g., always open) when in the data-input mode of operation. It may be configured to close the output gate when entering the key-input mode. It may be configured to open the output gate once the cryptographic operation has been applied to all of the key-influenced length of the combined data. The cryptographic module may be configured to enter the data-input mode of operation automatically once the cryptographic operation has been applied to all of the key-influenced length of the combined data, or it may enter the data-input mode in response to an input such as an instruction from a processor.

In some embodiments, the control unit is configured to monitor the inputting of the key data to the combining operation. The control unit may be configured to detect when the combining operation has received, or been applied to, an amount of key data corresponding to the key length information. The control unit may be configured to detect when the cryptographic operation has received, or been applied to, the key-influenced length of the combined data. In some embodiments this cryptographic-operation detection may be identical to the combining-operation detection—for example, where the output of the combining operation feeds directly into the cryptographic operation, and where the key-influenced length is equal to the key length—but in other embodiments they may be separate. The control unit may open the output gate in response to making such a cryptographic-operation detection, or in response to making both such a combining-operation detection and such a cryptographic-operation detection.

In some embodiments, the cryptographic module comprises safeguard logic that prevents the cryptographic operation from being interrupted or finalised early, at least when in the key-input mode—i.e. before a normal completion point. In some implementations, this safeguard logic may be sufficient to cause the module not to output any of the first output data from the cryptographic module until after the cryptographic operation has been applied to all of the key-influenced length of the combined data. In other embodiments, it may be present in addition to an output gate, as described above, to provide an extra layer of protection.

In the data-input mode of operation, the cryptographic module may be configured to receive, and apply the cryptographic operation to, input data of any length—not only data that is shorter than the key-influenced length. Thus, the cryptographic module may be configured, when in the data-input mode, to: receive a quantity of third input data having a length that is equal to or greater than said key-influenced length; perform the cryptographic operation on the third input data to generate third output data; and output the third output data.

Outputting data may comprise placing the data in a shared memory location or a register of the cryptographic module, to be read by another component such as a processor, or it may comprise outputting the data over a bus or other data channel. The cryptographic module may be configured to interrupt a processor when output data is available.

In one set of embodiments, the cryptographic operation is a cryptographic hash operation, such as SHA-1, SHA-2, SHA-3 or MD5. In other embodiments, it may be a symmetric cipher operation, such as AES, Twofish, Serpent, Blowfish, CAST5, Kuznyechik, RC4, 3DES, Skipjack, SAFER or IDEA.

The combining operation may comprise concatenating key data and first input data, or performing a mathematical function on the key data and the first input data, such as a bitwise XOR operation, or performing a cryptographic operation, such as a hash operation, or a combination of these. The combining operation may comprise applying a modulo arithmetic operation to the key data and the first input data, such as a modulo addition or a modulo multiplication, which may be applied to parts or the whole of the key data and parts or the whole of the first input data. Note that bitwise XOR is a type of modulo arithmetic operation, being equivalent to bitwise modulo-2 addition.

In one set of embodiments, the combining operation is a bitwise XOR of the key data and the first input data. The first input data may be the same length as the key data, or it may be longer than the key data. If it is longer, in some embodiments a contiguous portion of the first input data is XOR'd with the key data. Unless the key data is split up before the XOR operation, the key-influenced length of the combined data will be equal to the length of the key data (the key length). The combined data may include data bits that are not influenced by the key data, such as a portion of the first input data, if the first input data is longer than the key data.

Being able to perform an XOR operation in this way makes such embodiments of the cryptographic module well suited for use in efficiently calculating a keyed-hash message authentication code (HMAC).

A device incorporating the cryptographic module may be configured to use the cryptographic module to calculate an H MAC. It may be configured to provide first input data consisting of a repeated byte, such as a succession of "0x36" bytes or a succession of "0x5c" bytes. The device may comprise a memory storing software for controlling the cryptographic module—e.g., to calculate an HMAC and/or to perform a key-derivation function (KDF) such as PBKDF2.

In one set of embodiments, the cryptographic module is a hardware module. It preferably does not contain a general-purpose processor executing software instructions. It may instead comprise a plurality of electronic logic gates for performing the combining operation and/or for performing the cryptographic operation. In this way, it may be able to substantially accelerate the generation of output data, compared with an equivalent software implementation, while also freeing up a processor for other tasks. The cryptographic module may comprise one or more input registers for receiving the key data, key length information, input data and any control instructions. The cryptographic module may be a slave device on a general bus (e.g., for receiving the input data and any control instructions); it may be a slave device on a secure bus (e.g., for receiving the key data and the key length information). Alternatively, the cryptographic module may be a bus master and may actively fetch data from one or more memory addresses, or it may receive inputs over dedicated signal lines. The cryptographic module may comprise one or more output registers for providing output data to a processor or other peripheral.

However, in another set of embodiments, the cryptographic module is implemented wholly or partly in software. Thus the cryptographic module may be software, or a computer program. From another aspect, the invention provides a transitory or non-transitory storage medium or signal bearing such a software cryptographic module. In particular, the combining operation may be implemented in software—e.g., a bitwise XOR routine that is executed by a general-purpose processor, such as an ARM™ Cortex-M™ processor. Likewise, the cryptographic operation may be implemented in software—e.g., a cryptographic hash routine, which may have been compiled from C language source code into machine code. The cryptographic module may define or provide an application programming interface (API) for receiving the key data, key length information and input data, and for outputting the output data. It may receive and output data at predetermined memory addresses. From a further aspect, the invention provides a processing device comprising memory storing software instructions that provide a cryptographic module as disclosed herein. The processing device may have a hardware key store, distinct from a general-purpose processor of the device, as described elsewhere herein. The device preferably provides a secure execution environment for executing the combining operation and/or the cryptographic operation, such as a processor executing these operations in a privileged or kernel execution mode, to prevent information about the key data being discovered by malicious software on the device.

When the cryptographic module is a hardware module, the cryptographic module may comprise an electronic XOR logic gate for performing the combining operation. The XOR logic gate may have a first input that is coupled to a memory that can store the input data (the first input data, second input data, etc.). The cryptographic module may comprise a multiplexer, and the XOR logic gate may have a second input that is coupled to an output of the multiplexer. The multiplexer may be arranged to output (i) bits of the key data or (ii) "zero" bits, depending on a state of a select line to the multiplexer. The control unit may be connected to the signal line, and may be configured to control the state of the multiplexer. The state of the multiplexer may depend on the mode of operation of the cryptographic module—i.e., key-input mode or data-input mode. The multiplexer may be controlled to output "zero" bits when the cryptographic module is in the data-input mode. In this way, the XOR logic gate simply passes the input data bits through without any change, when in the data-input mode. The multiplexer may be controlled to output bits of the key data when the cryptographic module is in the key-input mode. In this way, the XOR logic gate performs a bitwise XOR between the key data and the input data, when in the key-input mode. The output of the XOR logic gate may be connected directly to the input to a cryptographic operation unit, configured to perform the cryptographic operation (e.g., a SHA-256 hash) on the output of the XOR logic gate. The control unit may be configured to detect that a number of key data bits corresponding to the key length information is present in a key data register of the cryptographic module (e.g., the whole key has been received by the cryptographic module) before switching the multiplexer to output the key data, and/or before entering the key-input mode of operation. This can help to prevent any leaking of key information by preventing the cryptographic operation starting prematurely, before all the key data has been received.

Embodiments disclosed herein can help to prevent an attack in which an attacker tries to discover the key data by loading just one byte of key data, XOR'd with a single byte of input data that is known to the attacker (e.g., 0x00), into the cryptographic module, and then finalising the cryptographic operation (e.g., a SHA-256 hash). Since there are only 256 possibilities for the value of this one byte of key data, the first byte of key data could otherwise readily be determined by comparing the output of the cryptographic operation with all 256 possible output values, which the attacker could have calculated separately. Without the protection of the present invention, the attacker could otherwise then move on to determine the value of the second byte of key data, by loading the known first byte of key data, and the unknown second byte, by finalising the cryptographic operation using just these two bytes of key data, and by against testing the output against 256 pre-calculated output values, and so on. However, because, in the present invention, the cryptographic module does not output results, when in key-input mode, until after the cryptographic operation has been applied to all of the key-influenced length of the combined data, the cryptographic module is protected against such an attack.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
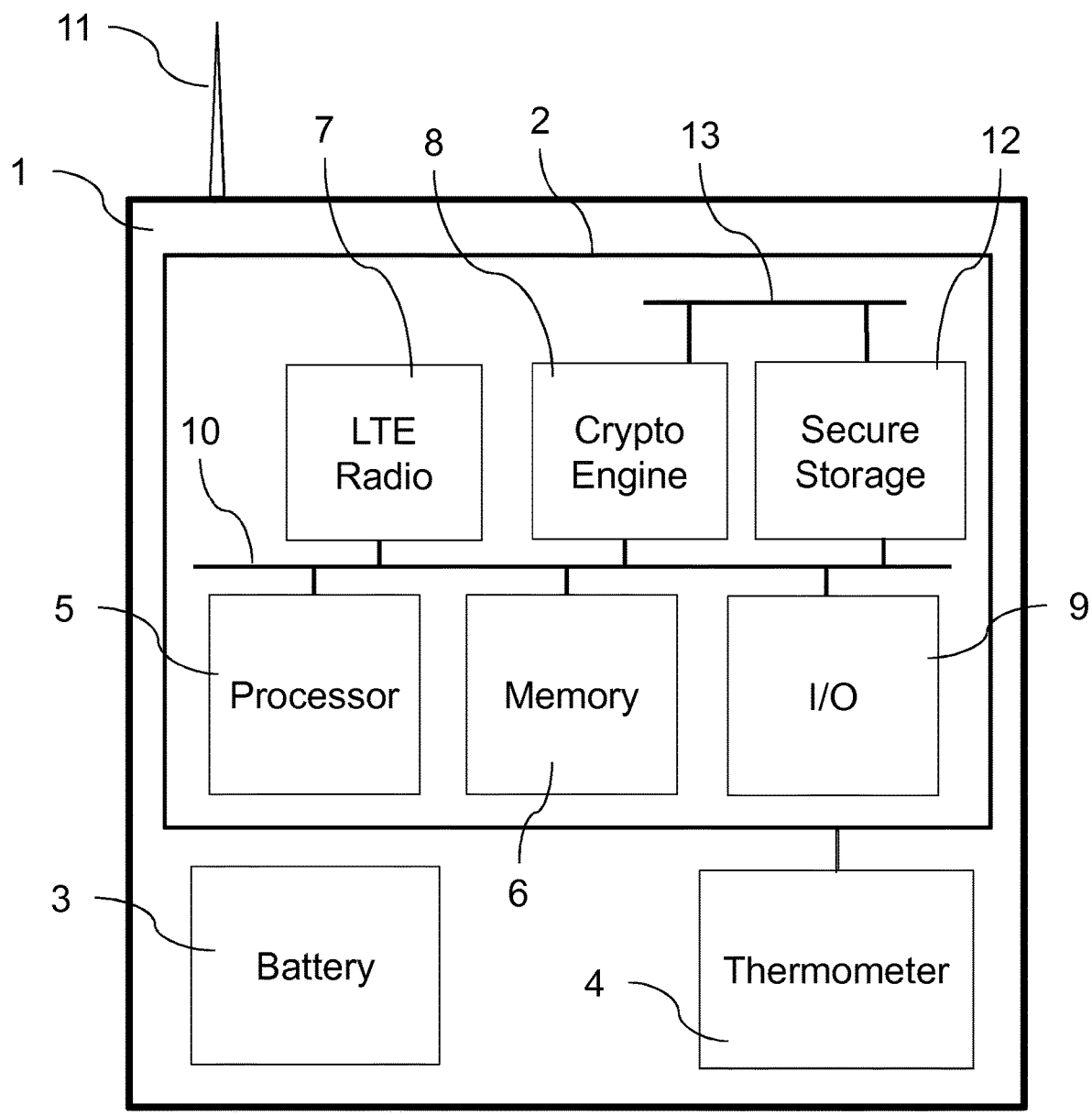
FIG. 1 is a schematic diagram of a wireless temperature sensor including a cryptography engine embodying the invention.

FIG. 1 shows a wireless temperature sensor 1 which contains an integrated radio chip 2, a battery 3 and a thermometer 4. It will be appreciated that it also contains other familiar, discrete components, such as PCBs, oscillators, capacitors, resistors, a housing, user interface features, etc. which are not shown in FIG. 1 for the sake of simplicity.

The radio chip 2 contains a processor 5, memory 6 (which may include volatile and non-volatile portions), an LTE Cat-M1 (LTE-M) radio 7, a hardware cryptography engine 8, an input/output peripheral 9, such as a USB interface, and a key store 12. These elements are all connected to a memory bus 10 which supports direct memory access (DMA) by bus masters other than just the processor 5. The sensor 1 also has an antenna 11 which is connected to the LTE-M radio 7 via appropriate off-chip components. The hardware cryptography engine 8 and the key store 12 are additionally connected to each other by a secure memory bus 13, which can be used to transfer sensitive data, such as cryptographic keys, securely from the key store 12 to the hardware cryptography engine 8 without being visible to the processor 5 or the other peripherals. The key store 12 may manage a number of different keys for the device.

The memory 6 stores software which is executed by the processor 5 for controlling the operation of the wireless temperature sensor 1. In use, the processor 5 uses the I/O peripheral 9 to fetch temperature readings from the thermometer 4 at intervals, and writes these to the memory 6. The wireless temperature sensor 1 periodically transmits a log of temperature information, by the LTE-M radio 7, to a network base station (not shown), from where it may travel to a destination (e.g., a remote server) on the Internet. The wireless temperature sensor 1 also computes an RFC 2104 keyed-hash message authentication code (HMAC) of the log, based on the SHA-256 algorithm. This HMAC is transmitted along with the log to authenticate and prove the integrity of the log data to the recipient.

Figure 2:
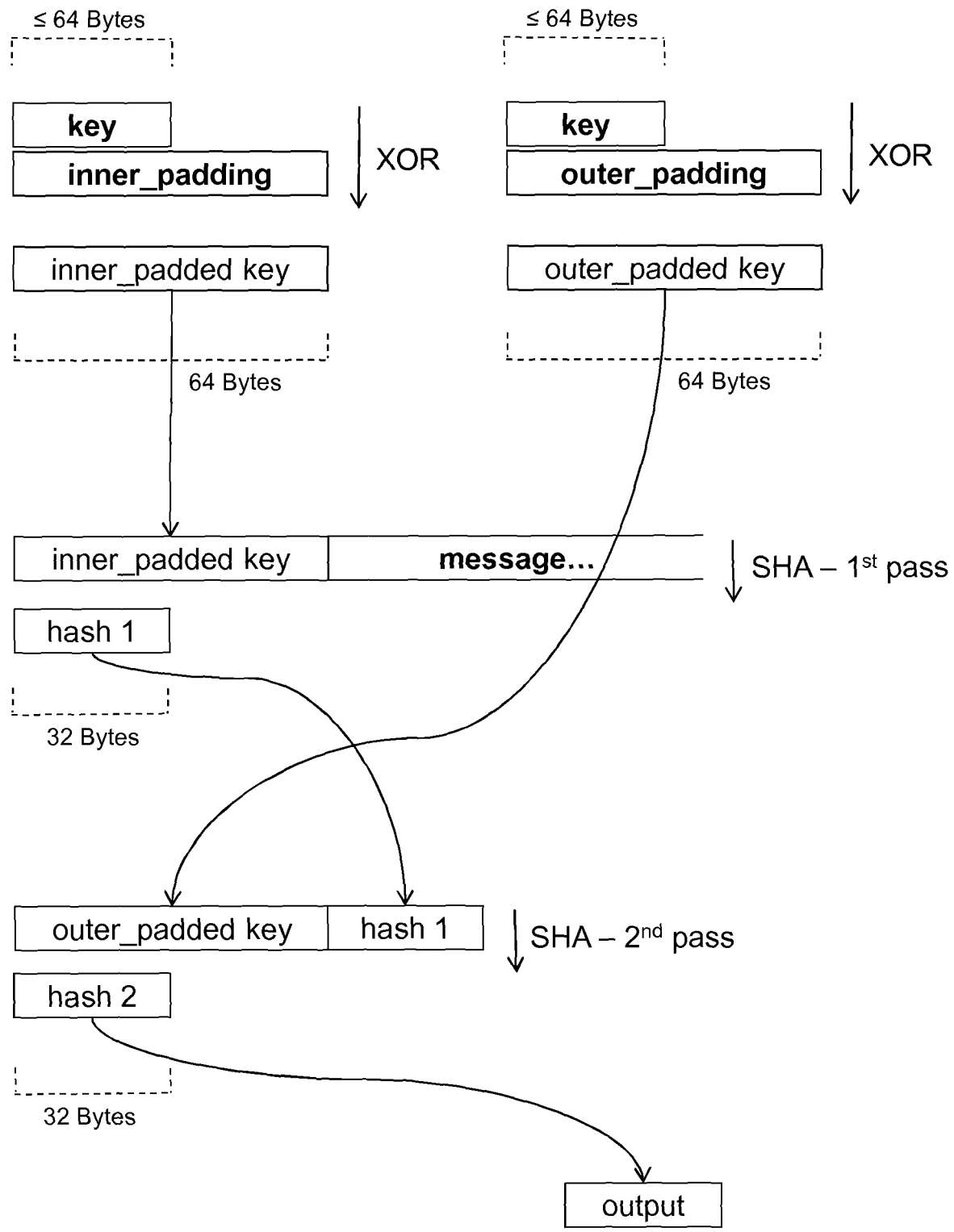
FIG. 2 is a schematic diagram showing the conventional steps in generating an HMAC according to RFC 2104.

FIG. 2 illustrates the conventional operations involved in generating an RFC 2104 HMAC using SHA-256. The "key" and "messages" are inputs to the algorithm. The value "hash sum 2" is the output HMAC. The process involves XOR and concatenation operations, as well as two SHA hash operations. Further details, including the definitions of the inner padding ("i_pad") and outer padding ("o_pad") values, can be found in RFC 2014 published by the Internet Research Task Force, the contents of which are hereby incorporated by reference.

The HMAC is generated under the control of software (stored in the memory 6) executing on the processor 5. However, the software makes use of the hardware cryptography engine 8 for performing the SHA-256-based hash operations which are performed as part of the HMAC generation. This approach is faster than a purely software-based implementation of the HMAC calculation. It is also more flexible than a full hardware implementation of the HMAC calculation. The hardware cryptography engine 8 includes a hash module as described in more detail below.

A secret key is stored in the key store 12, which can be sent to the hardware cryptography engine 8 over the secure bus 13, but cannot be accessed by the processor 5. The wireless temperature sensor 1 is designed so that it is not possible for an attacker, having control of the processor 5, to cause the hardware cryptography engine 8 to leak information about the secret key.

Figure 3:
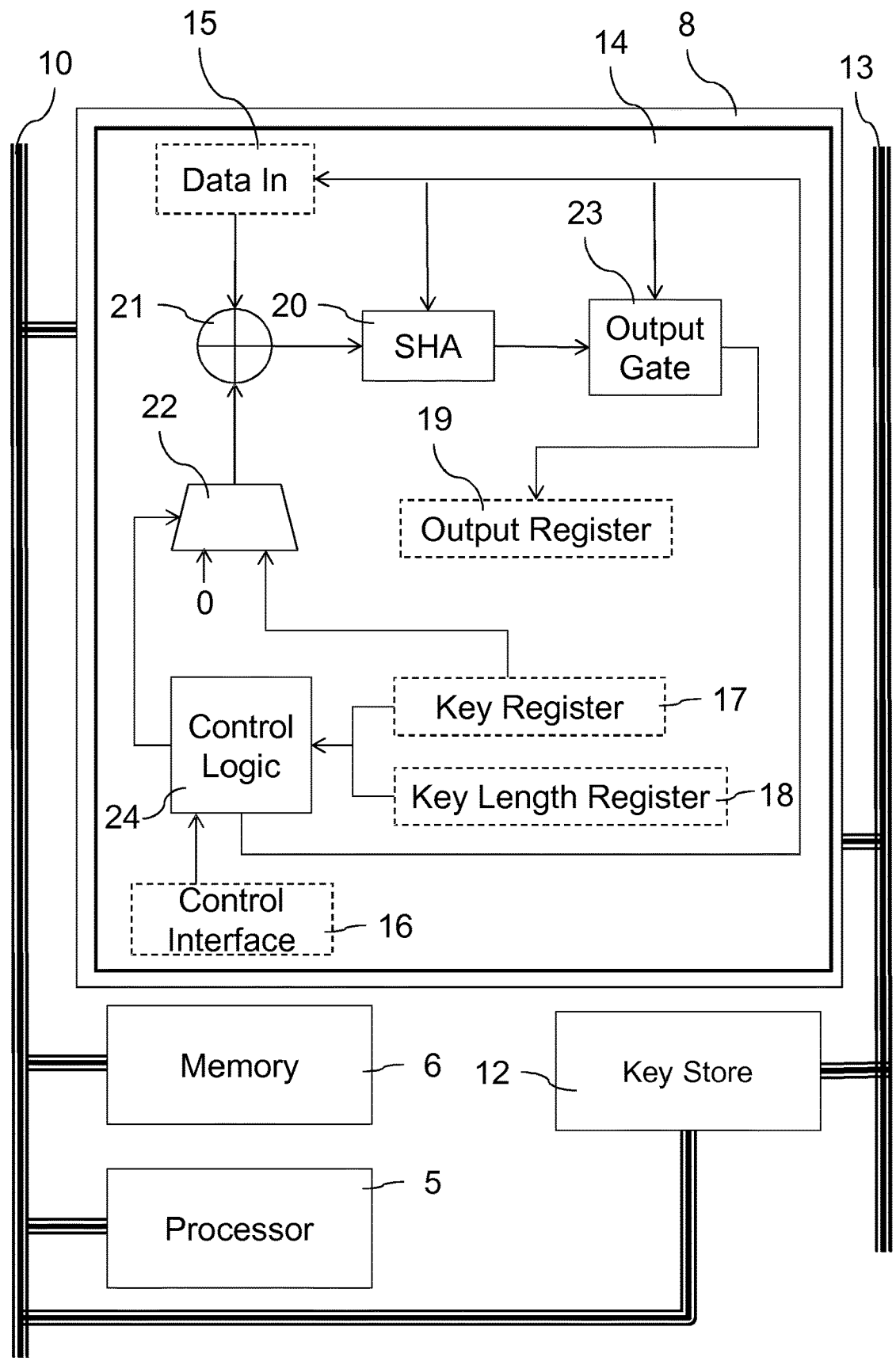
FIG. 3 is a schematic diagram showing additional details of the SHA-256 engine.

FIG. 3 shows how this is accomplished in some embodiments.

Inside the hardware cryptography engine 8 is a hash module 14 which is dedicated to performing SHA-256-based hash operations, which are used in the generation of the HMAC. The hash module 14 can also be used to support other operations, such as key derivation functions (KDF), cryptographic signature generation, hashed password comparisons, and generating message digests.

The hash module 14 has a data-input unit 15 for fetching input data from the memory 6 by direct memory access (DMA) over the bus 10. Of course, the use of DMA is not essential, and this could instead be implemented as an input register to which the processor 5 or another bus master can write input data. The hash module 14 also has a control interface 16 which may be a register interface, accessible over the memory 10, by which the processor 5 can control the operation of the hash module 14.

The hash module 14 also has a key register 17 to which the key store 12 can push a secret key, when instructed to do so by the processor 5. (The key store 12 may be configured to receive instructions from the processor 5 through a register interface accessed over the standard memory bus 10, or any other appropriate mechanism.) The key store 12 also pushes the length of the secret key to a key-length register 18 on the hash module 14 when writing the secret key (e.g., in parallel with, or immediately before writing the secret key). The writing of the key length happens automatically in response to the instruction from the processor 5 to push the secret key, such that the key cannot be output without the key length also having been output. The key register 17 and key-length register 18 are not accessible over the standard memory bus 10.

The hash module 14 has an output register 19 which can be read over the memory bus 10.

Internally, the hash module 14 contains: a SHA unit 20 for performing a SHA-256 hash operation (or any other SHA variant); an XOR gate 21 for combining key data with input data; a multiplexer 22 for selectively controlling the flow of key data to the XOR gate 21; an output gate 23 for controlling the flow of data from the SHA-256 unit 20 to the output register 19; and control logic 24 for receiving commands from the control interface 16 and for controlling the operation of the hash module 14.

The hash module 14 has two modes of operation: a data-input mode and a key-input mode. Switching between these two modes is controlled by the control logic 24.

In the data-input mode, input data is fetched from memory 6 by the data-input unit 15 and fed into the SHA unit 20. The resulting hashed data is allowed to pass straight to the output register 19 by the output gate 23. Although the input data goes via the XOR gate 21, it enters the SHA unit 20 unmodified. This is because, when in the data-input mode, the control logic 24 sets the multiplexer 22 so that it outputs a continual stream of "zero" bits to the XOR gate 21. These are XOR'd with the data from the data-input unit 15; however this does not alter the input data in any way.

In the key-input mode, the control logic 24 sets the multiplexer 22 to receive key bits from the key register 17. Before entering this mode, the key store 12 should therefore have pushed a secret key to the key register 17; this will also have caused the length of the secret key to have been written to the key-length register 18, as described above. The multiplexer 22 passes the key bits to the XOR gate 21. The stream of key bits is XOR'd with the input data received by the data-input unit 15 before being passed to the SHA unit 20. In this key-input mode, the control logic 24 closes the output gate 23 to prevent the SHA unit 20 from outputting any data to the output register 19.

The control logic 24 keeps the hash module 14 in the key-input mode while the following two conditions hold true:

(i) the key register 17 has received a number of bits from the key store 12 that is at least equal to the value in the key length register 18 (i.e., the whole secret key has been received into the key register 17); and (ii) the XOR gate 21 has received a number of bits from the key register 17, through the multiplexer 22, that is less than the value in the key length register 18 (i.e., the whole secret key has not yet been XOR'd with input data).

If the first of these conditions is false, the control logic 24 keeps the hash module 14 in the data-input mode until all of the key data has been written into the key register 17 by the key store 12.

When the second of these conditions becomes false, while in the key-input mode, the control logic 24 switches the hash module 14 to the data-input mode. The control logic 24 opens the output gate 23 and allows the SHA unit 20 to output the hash result to the output register 19. The output gate 23 then remains open, for further hash operations, until the control logic 24 next enters the key-input mode.

In some embodiments, the hash module 14 may output intermediate results to the output register 19 when the output gate 23 is open; this may be useful if the processor 5 wishes to interrupt an operation part-way through, capture the intermediate results, and then resume the operation at a later time. However, when in the key-input mode, the output gate 23 prevents any such output.

The hash module 14 can be used to generate an HMAC as follows.

First, the processor 5 places the HMAC inner pad values (sixty-four repeated "0x36" bytes) at an address in the memory 6, followed by the log data to be hashed. The processor 5 instructs the key store 12 to push the secret key to the hash module 14. This causes the key store 12 to write the key length (e.g., "32" bytes) to the key-length register 18 and to write the secret key to the key register 17, over the secure bus 13. The processor 5 uses the control interface 16 to instruct the hash module 14 to enter the key-input mode, and to provide the hash module 14 with the location of the inner pad values in the memory 6. The control logic 24 determines once all the bits of the secret key (e.g., 256 bits) have been written to the key register 17, and only then switches to the key-input mode, by signalling the multiplexer 22 to switch from outputting a stream of zero bits to outputting bits from the key register 17, and by signalling the output gate 23 to close.

The data-input unit 15 reads bits of the inner pad values up to the length of the secret key (e.g., 256 bits); these are XOR'd with the key bits, and the result passed to the SHA unit 20. The control logic 24 determines once all the bits of the secret key, as indicated in the key-length register 18, have been read from the key register 17, and, in response, switches to the data-input mode, by signalling the multiplexer 22 to switch to outputting a stream of zero bits, and by signalling the output gate 23 to open. The remaining bits of the inner padding, and the concatenated log data, are then fetched, XOR'd with the stream of zero bits, and fed into the SHA unit 20. The resulting 256-bit hash (from the 1st-pass hash of FIG. 2) is output to the output register 19, and the hash module 14 signals to the processor 5 that the first pass of hashing is complete (e.g., by signalling over an interrupt line, or any other appropriate mechanism).

The processor 5 reads the first hash result from the output register 19, then places the HMAC outer pad values (sixty-four repeated "0x5c" bytes) at an address in the memory 6, followed immediately by the first hash result. It then instructs the key store 12 to push the same secret key to the hash module 14 again, and the process repeats, but this time acting on the concatenation of the outer pad values and the first hash result, in order to generate the final HMAC in the $2^{nd}$-pass hash operation. Again, the processor 5 is informed once the operation is complete.

The processor 5 can then read the final HMAC from the output register 19. It may send it to the network, along with the log file, using the LTE-M radio 7, or perform any other desired operation with the HMAC.

Because SHA is a block based algorithm, intermediate calculation results may, in some implementations, be shown in the output register 19 when in the data-input mode. This may be useful, since it may enable the processor 5 to interrupt a long digest operation midway through, store the intermediate results, and then, at a later time, write the intermediate results back to the module 14 and instruct the module 14 to resume the operation. However, in the key-input mode, the output gate 23 ensures that any such intermediate results are gated off, so no intermediate results that might reveal sensitive key data are visible in the output register 19.

The design of FIG. 3 is more flexible than using a dedicated hardware HMAC functionality. It can, for example, support a secret key that is longer than one hash block in length (512 bits in SHA-256), because the processor 5 can first hash the secret key, and write the resulting 256-bit hash to the key store 12 to be used as an alternative secret key for the HMAC.

It will be appreciated by those skilled in the art that the invention has been illustrated by describing one or more specific embodiments thereof, but is not limited to these embodiments; many variations and modifications are possible, within the scope of the accompanying claims.

In particular, the same multiplexing and output-gate principles can be used without requiring a hardware cryptographic engine at all. Instead, for example, a memory protection unit which restricts unauthorised access to regions of memory could be used to provide a security boundary around a pure software HMAC implementation. This may prevent a user accessing the internal workings of the software, such as the intermediate hash results and the secret key. The multiplexing control and output-gate principles, described above, may then be applied in software, to prevent an attacker from being able to discover key data by interrupting the hash process before every bit of the secret key data has been processed through the hash algorithm.

It will also be appreciated that other hash algorithms than SHA-2 may be used, and that other cryptographic operations than HMAC may be used.

The invention claimed is:

1. A cryptographic module that is switchable between a key-input mode of operation and a data-input mode of operation, wherein:
   the cryptographic module comprises a cryptographic operation unit for performing a cryptographic operation and a data-input unit;
   when in the key-input mode of operation, the cryptographic module is configured to: receive key data, key length information and first input data, wherein the first input data is received at the data-input unit; combine an amount of the key data corresponding to the key length information with the first input data in a combining operation to produce combined data, wherein a key-influenced length of the combined data is a shortest length of the combined data that contains every data bit of the combined data whose value depends on the key data; perform said cryptographic operation on the combined data to generate first output data; and not output any of the first output data from the cryptographic module until after the cryptographic operation has been applied to all of the key-influenced length of the combined data;
   the cryptographic module is configured to output the first output data after the cryptographic operation has been applied to all of the key-influenced length of the combined data; and
   when in the data-input mode of operation, the cryptographic module is configured to: receive a quantity of second input data having a length that can be less than said key-influenced length, wherein the second input data is received at the data-input unit; perform the cryptographic operation on the second input data to generate second output data; and output the second output data.

2. The cryptographic module of claim 1, further comprising a control unit having an input for receiving instructions from a processor, wherein the control unit is configured to control whether the cryptographic module is in the key-input mode of operation or in the data-input mode of operation, in response to an instruction received at the input.

3. The cryptographic module of claim 1, comprising an output gate, downstream of the cryptographic operation unit, configured to block output from the cryptographic operation unit when the output gate is closed and to pass output from the cryptographic operation unit when the output gate is opened.

4. The cryptographic module of claim 3, configured to close the output gate when entering the key-input mode of operation and to open the output gate once the cryptographic operation has been applied to all of the key-influenced length of the combined data.

5. The cryptographic module of claim 1, comprising a control unit configured to detect when the combining operation has received, or been applied to, an amount of key data corresponding to the key length information, and to detect when the cryptographic operation has received, or been applied to, the key-influenced length of the combined data, wherein the control unit is configured to open the output gate in response to detecting i) that the combining operation has received, or been applied to, an amount of key data corresponding to the key length information and ii) that the cryptographic operation has received, or been applied to, the key-influenced length of the combined data.

6. The cryptographic module of claim 1, comprising safeguard logic for preventing the cryptographic operation from being interrupted or finalised early when the cryptographic module is in the key-input mode of operation.

7. The cryptographic module of claim 1, configured, when in the data-input mode, to: receive a quantity of third input data having a length that is equal to or greater than said key-influenced length; perform the cryptographic operation on the third input data to generate third output data; and output the third output data.

8. The cryptographic module of claim 1, wherein the cryptographic operation is a cryptographic hash operation.

9. The cryptographic module of claim 1, wherein the combining operation comprises applying a modulo arithmetic operation to the key data and the first input data.

10. The cryptographic module of claim 9, wherein the combining operation is a bitwise XOR of the key data and the first input data.

11. The cryptographic module of claim 1, wherein the cryptographic module is a hardware module comprising electronic logic gates for performing the combining operation and the cryptographic operation.

12. The cryptographic module of claim 11, comprising an electronic XOR logic gate for performing the combining operation, and further comprising a multiplexer controlled by a select line, wherein the XOR logic gate has a first input that is coupled to a memory for storing the first and/or second input data, and a second input that is coupled to an output of the multiplexer, wherein the cryptographic module is configured so that the multiplexer will output i) bits of the key data, or ii) zero bits, depending on a state of the select line.

13. The cryptographic module of claim 12, configured to control the multiplexer to output zero bits when the cryptographic module is in the data-input mode, and to output bits of the key data when the cryptographic module is in the key-input mode.

14. The cryptographic module of claim 1, wherein the cryptographic module is a computer program.

15. An electronic device comprising:
a cryptographic module as claimed in claim 11;
a processor;
a memory; and
a key store comprising a memory, for storing said key data, that is unreadable by the processor.

16. The electronic device of claim 15, wherein the key store is configured to provide the key data and the key length information to the cryptographic module in response to a single instruction from the processor.

17. The electronic device of claim 15, wherein the memory stores software comprising instructions which, when executed by the processor, cause the electronic device to use the cryptographic module to generate a keyed-hash message authentication code (HMAC).

18. A method of performing a cryptographic operation using the cryptographic module of claim 1, the method comprising:
receiving key data, key length information and first input data, wherein the first input data is received at the data-input unit;
combining an amount of the key data corresponding to the key length information with the first input data in a combining operation to produce combined data, wherein a key-influenced length of the combined data is a shortest length of the combined data that contains every data bit of the combined data whose value depends on the key data;
performing a cryptographic operation on the combined data to generate first output data;
not outputting any of the first output data until after the cryptographic operation has been applied to all of the key-influenced length of the combined data;
outputting the first output data after the cryptographic operation has been applied to all of the key-influenced length of the combined data;
receiving a quantity of second input data having a length that is less than said key-influenced length, wherein the second input data is received at the data-input unit;
performing the cryptographic operation on the second input data to generate second output data; and
outputting the second output data.

* * * * *